United States Patent
Avhale et al.

(10) Patent No.: US 10,155,909 B2
(45) Date of Patent: Dec. 18, 2018

(54) METHOD FOR START-UP AND OPERATION OF A FISCHER-TROPSCH REACTOR

(71) Applicant: SHELL OIL COMPANY, Houston, TX (US)

(72) Inventors: Abhijeet Uddhavarao Avhale, Amsterdam (NL); Avhale John Nash, Doha (QA); Thomas Joris Remans, Amsterdam (NL); Barend Roeland Vermeer, Doha (QA)

(73) Assignee: SHELL OIL COMPANY, Houston, TX (US)

( * ) Notice: Subject to any disclaimer, the term of this patent is extended or adjusted under 35 U.S.C. 154(b) by 164 days.

(21) Appl. No.: 15/126,452

(22) PCT Filed: Mar. 16, 2015

(86) PCT No.: PCT/EP2015/055423
§ 371 (c)(1),
(2) Date: Sep. 15, 2016

(87) PCT Pub. No.: WO2015/140100
PCT Pub. Date: Sep. 24, 2015

(65) Prior Publication Data
US 2018/0195007 A1    Jul. 12, 2018

(30) Foreign Application Priority Data
Mar. 17, 2014 (EP) .................................... 14160194

(51) Int. Cl.
| | |
|---|---|
| C10G 2/00 | (2006.01) |
| B01J 23/75 | (2006.01) |
| B01J 21/06 | (2006.01) |
| B01J 37/18 | (2006.01) |

(52) U.S. Cl.
CPC ............ *C10G 2/332* (2013.01); *B01J 21/063* (2013.01); *B01J 23/75* (2013.01); *C10G 2/30* (2013.01); *C10G 2/341* (2013.01); *B01J 37/18* (2013.01); *C10G 2300/1022* (2013.01); *C10G 2300/202* (2013.01); *C10G 2300/4031* (2013.01)

(58) Field of Classification Search
CPC ................ C10G 2300/202; C10G 2/32; C10G 2300/1022; C10G 2300/4081; B01J 23/8896; B01J 23/8913; B01J 37/0201
See application file for complete search history.

(56) References Cited

U.S. PATENT DOCUMENTS

| | | | |
|---|---|---|---|
| 4,595,703 A | 6/1986 | Payne et al. | |
| 4,626,552 A | 12/1986 | Arcuri | |
| 6,284,807 B1 | 9/2001 | Leviness et al. | |
| 7,855,236 B2 | 12/2010 | Van Hardeveld et al. | |
| 2005/0049317 A1 | 3/2005 | Raje et al. | |
| 2005/0154069 A1 | 7/2005 | Inga et al. | |
| 2005/0227866 A1 | 10/2005 | Berge et al. | |
| 2007/0287759 A1 | 12/2007 | Visagie et al. | |
| 2008/0262112 A1 | 10/2008 | Marion et al. | |
| 2008/0275144 A1 | 11/2008 | Van Hardeveld et al. | |
| 2011/0160510 A1 | 6/2011 | Claeys et al. | |
| 2012/0202899 A1 | 8/2012 | Visagie et al. | |

FOREIGN PATENT DOCUMENTS

| | | |
|---|---|---|
| WO | 199206784 | 4/1992 |
| WO | 199700231 | 1/1997 |

OTHER PUBLICATIONS

International Search Report dated Jun. 16, 2015; 4 pages (PCT/EP2015/055423-SP0400).

*Primary Examiner* — Jafar F Parsa

(57) ABSTRACT

The invention relates to a method for start-up and operation of a Fischer-Tropsch reactor comprising the steps of: (a) providing a reactor with a fixed bed of reduced Fischer-Tropsch catalyst that comprises cobalt as catalytically active metal; (b) supplying a gaseous feed stream comprising carbon monoxide and hydrogen to the reactor, wherein the gaseous feed stream comprises a nitrogen-containing compound other than molecular nitrogen in an initial concentration, wherein the initial concentration in the range of from 10 to 350 ppbv based on the volume of the gaseous feed stream; (c) converting carbon monoxide and hydrogen supplied with the gaseous feed stream to the reactor into hydrocarbons at a reaction temperature and at a set reactor productivity, whilst maintaining the initial concentration of the nitrogen-containing compound and maintaining the set reactor productivity during a first time period by adjusting the reaction temperature; (d) decreasing the concentration of the nitrogen-containing compound to a second concentration in the range of from 0 to 20 ppbv, wherein the second concentration is at least 5 ppbv below the initial concentration, preferably at least 20 ppbv below the initial concentration, and maintaining the reactor productivity by adjusting the reaction temperature.

14 Claims, No Drawings

METHOD FOR START-UP AND OPERATION OF A FISCHER-TROPSCH REACTOR

PRIORITY CLAIM

The present application is the National Stage (§ 371) of International Application No. PCT/EP2015/055423, filed Mar. 16, 2015, which claims priority from European Patent Application No. 14160194.8, filed Mar. 17, 2014, incorporated herein by reference.

FIELD OF THE INVENTION

The present invention relates to a method for start-up and operation of a Fischer-Tropsch reactor containing a Fischer-Tropsch catalyst, wherein at least during start-up of the reactor the activity of the catalyst is decreased.

The catalyst is suitable for use in producing normally gaseous, normally liquid and optionally solid hydrocarbons from synthesis gas generally provided from a hydrocarbonaceous feed, in a Fischer-Tropsch process. In the current specification such a catalyst is referred to as a Fischer-Tropsch catalyst.

BACKGROUND TO THE INVENTION

The Fischer-Tropsch process can be used for the conversion of synthesis gas into liquid and/or solid hydrocarbons. The synthesis gas may be obtained from hydrocarbonaceous feedstock in a process wherein the feedstock, e.g. natural gas, associated gas and/or coal-bed methane, heavy and/or residual oil fractions, coal, biomass, is converted in a first step into a mixture of hydrogen and carbon monoxide. This mixture is often referred to as synthesis gas or syngas. The synthesis gas is then fed into a reactor where it is converted in one or more steps over a suitable catalyst at elevated temperature and pressure into paraffinic compounds and water in the actual Fischer-Tropsch process. The obtained paraffinic compounds range from methane to high molecular weight modules. The obtained high molecular weight modules can comprise up to 200 carbon atoms, or, under particular circumstances, even more carbon atoms. Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer-Tropsch synthesis often comprise a carrier-based support material and one or more metals from Group 8-10 of the Periodic Table of Elements, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

One of the limitations of a Fischer-Tropsch process is that the activity of the catalyst will, due to a number of factors, decrease over time. The activity of the catalyst is decreased as compared to its initial catalytic activity. The initial activity of the catalyst can be its activity when fresh prepared. A catalyst that shows a decreased activity after use in a Fischer-Tropsch process is sometimes referred to as deactivated catalyst, even though it usually still shows activity. Sometimes such a catalyst is referred to as a deteriorated catalyst. Sometimes it is possible to regenerate the catalyst. This may be performed, for example, with one or more oxidation and/or reduction steps.

After regeneration, catalysts often show an activity that is lower than the activity of fresh prepared catalysts. Especially after multiple regenerations, it often proofs hard to regain an activity level comparable to the activity of fresh prepared catalysts. In order to be able to use a catalyst for a long time, it thus may be desirable to start a Fischer-Tropsch process with a fresh catalyst that has a relatively high activity.

The use of fresh or rejuvenated catalysts with a relatively high initial activity may have disadvantages. This may especially be the case when the amount of catalyst used in a reactor tube is fixed after loading of the catalyst in the reactor tube. One example of a reactor tube filled with a fixed amount of catalyst is a reactor tube filled with a packed bed of catalyst particles.

In a Fischer-Tropsch process with a catalyst with a relatively high initial activity, the activity of the catalyst is especially high at the start of the process. And, due to the high activity of the catalyst, a lot of water is produced in the Fischer-Tropsch hydrocarbon synthesis, resulting in a high relative humidity at the start of the Fischer-Tropsch process. During Fischer-Tropsch synthesis the relative humidity in a reactor tube may increase to such a level that it accelerates the deactivation of the catalyst during use. During start-up of a Fischer-Tropsch reactor with a very active catalyst, the reaction temperature is typically kept at a relatively low value, e.g. below 200° C., in order to avoid a too high product yield and accompanying high temperature rise due to the exothermic reaction. Without wishing to be bound to any theory, it is believed that especially the combination of relatively low temperature and a relatively high yield results in a high relative humidity in the reactor and therewith in undesired irreversible catalyst deactivation.

Therefore, especially in the start-up phase of a Fischer Tropsch reactor with a catalyst with a relatively high activity, the deactivation of the catalyst takes place at a relatively high rate. Deactivation due to relative humidity proofed to be difficult to reverse. The high initial activity in such a case is thus quickly lost, whereas regeneration procedures have only a limited effect.

SUMMARY OF THE INVENTION

It is an object of the present invention to provide an improved Fischer-Tropsch process in which a cobalt catalyst is used that has a relatively high initial activity. Especially the start-up of a Fischer-Tropsch reactor is improved. Preferably, also the start-up of a Fischer-Tropsch reactor after a regeneration step is improved.

It has now been found that by supplying a feed gas stream comprising a very small amount of a nitrogen-containing compound other than molecular nitrogen to the catalyst at the start-up and initial stage of operation of a Fischer-Tropsch reactor, improves the stability of the catalyst. By supplying a nitrogen-containing compound to the freshly prepared or rejuvenated reduced catalyst, the catalyst activity is slightly decreased and the temperature can be slightly increased in order to achieve a set reactor productivity (yield). At the same time, the relative humidity is slightly decreased. After a certain period of time, the concentration of the nitrogen-containing compound in the feed gas steam is decreased to a value in the range from 0 to 20 ppbv.

Accordingly, the present invention relates to a method for start-up and operation of a Fischer-Tropsch reactor comprising the steps of:
(a) providing a reactor with a fixed bed of reduced Fischer-Tropsch catalyst that comprises cobalt as catalytically active metal;
(b) supplying a gaseous feed stream comprising carbon monoxide and hydrogen to the reactor, wherein the gaseous feed stream comprises a nitrogen-containing compound other than molecular nitrogen in an initial concentration, wherein the initial concentration in the range of from 10 to 350 ppbv based on the volume of the gaseous feed stream;
(c) converting carbon monoxide and hydrogen supplied with the gaseous feed stream to the reactor into hydrocarbons at a reaction temperature and at a set reactor productivity, whilst maintaining the initial concentration of the nitrogen-containing compound and maintaining the set reactor productivity during a first time period by adjusting the reaction temperature;
(d) decreasing the concentration of the nitrogen-containing compound to a second concentration in the range of from 0 to 20 ppbv, wherein the second concentration is at least 5 ppbv below the initial concentration, preferably at least 20 ppbv below the initial concentration, and maintaining the reactor productivity by adjusting the reaction temperature.

It has surprisingly been found that despite the fact that the very low concentration of the nitrogen-containing compound has only a small effect on the catalyst activity and therewith on the reaction temperature needed to achieve the set reactor productivity (a small increase in reaction temperature compared to a feed gas stream without such nitrogen-containing compound) the effect on catalyst stability is significant. In other words, under the conditions of the method according to the invention, the relatively high relative humidity at start-up and initial operation stage of the reactor appears not to have a negative effect on catalyst activity. An advantage of the method according to the invention is a good C5+ selectivity due to the relatively low reaction temperature during the first time period.

A further advantage of the method according to the invention is that synthesis gas that is contaminated with small amounts of HCN and/or ammonia can be used for the start-up of a Fischer-Tropsch reactor loaded with freshly prepared or rejuvenated catalyst, without the need to deeply remove such contaminants from such synthesis gas.

DETAILED DESCRIPTION OF THE INVENTION

The method according to the invention is a method for start-up and operation of a Fischer-Tropsch reactor. The method comprises a first step of providing a reactor with a fixed bed of reduced Fischer-Tropsch catalyst. The catalyst comprises cobalt as catalytically active metal.

The catalyst may be a fresh catalyst or a rejuvenated catalyst. Reference herein to a fresh catalyst is to a freshly prepared catalyst that has not been subjected to a Fischer-Tropsch process. Reference herein to a rejuvenated catalyst is to a regenerated catalyst of which the initial activity has been at least partially restored, typically by means of several reduction and/or oxidation steps. The catalyst is preferably a fresh catalyst, since in particular fresh catalysts have a very high initial activity.

The catalyst comprises cobalt as catalytically active metal. Fischer-Tropsch catalysts comprising cobalt as catalytically active metal are known in the art. Any suitable cobalt-comprising Fischer-Tropsch catalysts known in the art may be used. Typically such catalyst comprises cobalt on a carrier-based support material, optionally in combination with one or more metal oxides and/or metals as promoters selected from zirconium, titanium, chromium, vanadium and manganese, especially manganese. A most suitable catalyst comprises cobalt as the catalytically active metal and titania as carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are suitable promoters. Suitable metal promoters may be selected from Groups 7-10 of the Periodic Table of Elements. Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

A most suitable catalyst comprises cobalt as the catalytically active metal and zirconium as a promoter. Another most suitable catalyst comprises cobalt as the catalytically active metal and manganese and/or vanadium as a promoter. If the catalyst comprises cobalt as the catalytically active metal and manganese and/or vanadium as promoter, the cobalt: (manganese+vanadium) atomic ratio is advantageously at least 12:1.

It has been found that the method according to the invention is particularly suitable for start-up and operation of a Fischer-Tropsch reactor containing a catalyst without a noble metal as promoter. Therefore, the catalyst preferably does not comprise a noble metal.

References to "Groups" and the Periodic Table as used herein relate to the new IUPAC version of the Periodic Table of Elements such as that described in the 87th Edition of the Handbook of Chemistry and Physics (CRC Press).

In step (a) a reactor is provided with a fixed bed of the catalyst, preferably with a fixed bed of catalyst particles, more preferably in a multi-tubular fixed bed reactor configuration.

The reactor is provided with a fixed bed of reduced catalyst in step (a). In a reduced catalyst the cobalt is essentially in its metallic state. The reactor may be provided with a fixed bed of reduced catalyst by reducing a fixed bed of catalyst precursor in-situ, i.e. in the same reactor wherein the Fischer-Tropsch hydrocarbon synthesis will take place, or by loading the reactor with a reduced catalyst that has for example be prepared by reducing a catalyst precursor in a separate vessel or reactor prior to loading the reduced catalyst in the reactor. Preferably the reactor is provided with a fixed bed of reduced catalyst by reducing a fixed bed of catalyst precursor in-situ.

Reference herein to a catalyst precursor is to a precursor that can be converted into a catalytically active catalyst by subjecting the precursor to reduction, usually by subjecting the precursor to hydrogen or a hydrogen-containing gas using reducing conditions. Such reduction step is well-known in the art.

Once the reactor with reduced Fischer-Tropsch catalyst is provided in step (a), Fischer-Tropsch hydrocarbon synthesis is started in steps (b) and (c) by supplying a gaseous feed stream comprising carbon monoxide and hydrogen to the reactor. The gaseous feed stream comprises a nitrogen-containing compound other than molecular nitrogen in a concentration in the range of from 10 ppbv to 350 ppbv based on the volume of gaseous feed stream. The gaseous feed stream may be supplied to the reactor at any suitable gas hourly space velocity. In step (c), carbon monoxide and hydrogen in the gaseous stream supplied to the reactor are converted into hydrocarbons at a reaction temperature and at a set reactor productivity. The conversion in step (c) may be carried out at any suitable reaction pressure. The reactor productivity is set at a desired value, preferably a value in the range of from 75 to 500 grams hydrocarbons per liter of catalyst per hour, more preferably in the range of from 100 to 350 grams hydrocarbons per liter of catalyst per hour.

Reference herein to reactor productivity is to space time yield of the reactor, i.e. the amount of hydrocarbons produced per volume of catalyst per hour (g/l.h). Reference herein to maintaining the reactor productivity is to maintaining the reactor productivity within 10% of the set value, i.e. in a range of from 90 to 110% of the set value.

Reference herein to activity of the catalyst is to the intrinsic activity of the catalyst. It is thus a property of the catalyst and not dependent on the actual reaction conditions applied.

Reference herein to the reaction temperature is to the temperature of coolant, typically cooling water, surrounding the fixed bed of catalyst.

Reference to the gaseous feed stream to the reactor is to the combined feed stream to the reactor including any gaseous recycle stream.

The presence of the nitrogen-containing compound at the initial concentration during the first time period slightly reduces the (intrinsic) activity of the catalyst. Due to this lower activity, the reaction temperature can be set at a slightly higher value compared to a situation without nitrogen-containing compound to achieve the set reactor productivity. In order to compensate for gradual loss in catalyst activity during operation of the Fischer-Tropsch reactor, the reaction temperature is adjusted, i.e. increased, such that the set reactor productivity is maintained.

After the first period of time, the concentration of the nitrogen-containing compound is decreased to a second concentration in the range of from 0 to 20 ppbv in step (d). Also in step (d), the reactor productivity is maintained at the set value, i.e. the same value as set in step (c). This is done by adjusting the reaction temperature. Immediately upon decreasing the concentration of the nitrogen-containing compound from the initial to the second concentration, a slight temperature decrease might be needed to maintain the reactor productivity at the set value. Thereafter, the reaction temperature is increased in order to compensate for loss in catalyst activity.

The initial concentration of the nitrogen-containing compound is in the range of from 10 to 350 ppbv, preferably of from 20 to 150 ppbv, more preferably of from 30 to 50 ppbv. The initial concentration is maintained during a first time period. The first time period is preferably in the range of from 50 to 5,000 hours, more preferably of from 100 to 2,000 hours, eve more preferably of from 200 to 1,500 hours. After the first time period, the concentration of the nitrogen-containing compound is decreased, preferably in a single step, to a second concentration in the range of from 0 to 20 ppbv, more below 10 ppbv. The decrease in concentration, i.e. the difference between the initial and the second concentration, is at least 5 ppbv, preferably at least 20 ppbv.

The conversion of carbon monoxide and hydrogen into hydrocarbons in steps (c) and (d) may be carried out at any reaction pressure and gas hourly space velocity known to be suitable for Fischer-Tropsch hydrocarbon synthesis. Preferably, the reaction pressure is in the range of from 10 to 100 bar (absolute), more preferably of from 20 to 80 bar (absolute). The gas hourly space velocity is preferably in the range of from 500 to 25,000 $h^{-1}$, more preferably of from 900 to 15,000 $h^{-1}$, even more preferably of from 1,300 to 8,000 $h^{-1}$. Preferably, the reaction pressure and the gas hourly space velocity are kept constant in steps (c) and (d).

The nitrogen-containing compound may be any nitrogen-containing compound other than molecular nitrogen that is gaseous under the process conditions applied. Examples of suitable nitrogen-containing compounds are ammonia, HCN, NO, amines, organic cyanides (nitriles), or heterocyclic compounds containing at least one nitrogen atom as ring member of a heterocyclic ring. Preferably, the nitrogen-containing compound is ammonia, HCN, NO or an amine. Preferred amines include amines with one or more alkyl or alcohol groups having up to five carbon atoms. More preferably, the amine is a mono-amine. Examples of especially preferred amines include trimethylamine, dipropylamine, diethanolamine, and methyl-diethanolamine. A particularly preferred nitrogen-containing compound is ammonia.

The nitrogen-containing compound may be added to the gaseous feed stream or may be present in the gaseous feed stream as contaminant. If added, then the concentration of nitrogen-containing compound(s) is preferably decreased by stopping addition of such compound(s). If a nitrogen-containing compound is present as contaminant, for example by using, as (part of) the gaseous feed stream, a synthesis gas from which contaminants such as HCN and ammonia have not or only to a limited extent removed, the concentration of the nitrogen-containing compound(s) can be decreased by using a cleaner stream of synthesis gas in step (d), for example a stream of synthesis gas comprising less than 10 ppbv of such compounds.

Without wishing to be bound to any theory, it is believed that the nitrogen-containing compound effects reversible poisoning of the catalyst. At the initial contact of the reduced catalyst provided in step (a) with gaseous feed stream comprising nitrogen-containing compound, it may take a certain time before the poisoning effect and therewith the desired initial decrease in catalyst activity has been achieved. This implies that it might be necessary to take additional measures, in order to avoid a too high yield and/or to avoid the risk of a temperature trip in the very initial stage of the operation of the reactor.

In has further been found that a sufficient degree of catalyst poisoning, and therewith a sufficient decrease in activity of the catalyst, can be achieved from the start of steps (b) and (c) of the method by providing in step (a) the reactor with a fixed bed of reduced catalyst by means of in-situ reduction of a fixed bed of catalyst precursor, i.e. of non-reduced catalyst, in the presence of ammonia. Such in-situ reduction in the presence of ammonia may be carried out by contacting the fixed bed of catalyst precursor in-situ, i.e. after loading the fixed bed of catalyst precursor in the reactor, under reducing conditions with a reducing gas comprising ammonia. Alternatively, the loaded fixed bed of catalyst precursor may be in-situ reduced by contacting the loaded catalyst precursor under reducing conditions with a reducing gas comprising nitrogen. It has been found that under these conditions, nitrogen is in-situ converted into ammonia.

Accordingly, the reactor is preferably provided with reduced catalyst by contacting a fixed bed of catalyst precursor in-situ with a hydrogen-containing gas comprising ammonia or nitrogen at a reduction temperature and pressure. The reduction temperature and pressure may be any suitable reduction temperature and pressure. Suitable reduction temperatures and pressures are known in the art and typically comprise a temperature in the range of from 220° C. to 450° C., preferably of from 240° C. to 350° C. and a pressure in the range of from 0.1 bar (absolute) to the pressure at which the Fischer-Tropsch reactor is to be operated, more preferably of from 0.2 bar (absolute) to 60 bar (absolute), even more preferably of from 1 bar (absolute) to 20 bar (absolute). The gas hourly space velocity of the hydrogen-containing gas during in-situ reduction with added or in-situ formed ammonia is preferably in the range of from 1-1,000 $h^{-1}$, more preferably of from 1-500 $h^{-1}$. Preferably, the hydrogen-containing gas comprises ammonia in a concentration in the range of from 2 to 1000 ppmv, more preferably in the range of from 5 to 100 ppmv, or nitrogen in a concentration in the range of from 0.1 to 90 vol %, more preferably of from 1 to 60 vol %, even more preferably of from 10 to 50 vol %, based on the total volume of hydrogen-containing gas. Preferably, ammonia or nitrogen is present in the hydrogen-comprising reducing gas during only a part of the contacting of the catalyst precursor with the hydrogen-comprising reducing gas, more preferably only at the end of the reduction period, more preferably during at most 50 hours, even more preferably during at most 40 hours.

Without wishing to be bound to any theory it is believed that under typical reduction conditions of temperature and pressure, and in the presence of a solid catalytic surface, hydrogen and nitrogen react to form ammonia. Under the reduction conditions applied, the Fischer-Tropsch catalyst and/or the metallic reactor wall may serve as solid catalytic surface. The in-situ formed ammonia will serve as poison for the Fischer-Tropsch catalyst and therewith suppress the catalyst activity even prior to supplying the gaseous feed stream comprising carbon monoxide and hydrogen to the catalyst. Thus, an initial stage with a too active catalyst can be prevented.

The method according to the invention may be applied for the start-up and further operation of a Fischer-Tropsch reactor with a fresh catalyst or with a regenerated catalyst. The method according to the invention is particularly suitable for a Fischer-Tropsch reactor containing a fresh catalyst.

It has been found that by using the method according to the invention, catalyst stability is improved in the sense that it takes longer until the activity of the catalyst has decreased to such a low level that rejuvenation of the catalyst is needed.

A Fischer-Tropsch process typically comprises more than one reactors in series. In a Fischer-Tropsch process with several reactors, the method according to the invention may be applied in only one or in only a part of the reactors, i.e. any reactor loaded with fresh catalyst or with rejuvenated catalyst.

The invention is illustrated by the following non-limiting examples.

EXAMPLES

Example 1 (Invention)

A gaseous feed stream comprising 50 ppbv nitrogen-containing compounds (HCN and ammonia) was supplied to a reactor tube comprising reduced cobalt-based Fischer-Tropsch catalyst, at an inlet pressure of 60 bar (absolute). The gaseous feed was composed of fresh synthesis gas (50%) and synthesis gas recycled from the reactor tube (50%). The synthesis gas comprised 75% decontaminated synthesis gas with a concentration of HCN and ammonia in the range of from 2 to 10 ppbv and 25% of synthesis gas from a steam methane reforming unit with a concentration of HCN and ammonia of approximately 800 ppbv. The recycled synthesis gas was free of HCN and ammonia.

The reaction temperature needed for a space time yield (STY) of 200 g/l.h was 202° C. During 865 runhours, the gaseous feed stream was kept the same and the gas hourly space velocity and the space time yield was maintained at 200 g/l.h by gradually increasing the reaction temperature. Then the fresh synthesis gas was changed to 100% decontaminated synthesis gas with a concentration of HCN and ammonia of 10 ppbv. Again the space time yield was maintained at 200 g/l.h and the reaction temperature adjusted. Immediately upon changing the gaseous feed stream, the reaction temperature had to be decreased by 3° C. to keep the space time yield at 200 g/l.h. Thereafter, the reaction temperature had to be gradually increased to compensate for loss in catalyst activity. The inlet pressure was 60 bar (absolute) during the entire experiment.

At 1,800 runhours from the start of the reactor, the experiment was stopped and the intrinsic activity of the catalyst was determined.

Example 2 (Comparative)

The experiment of Example 1 was repeated but now the fresh synthesis gas was 100% decontaminated synthesis gas from the start of the experiment. As in experiment 1, the reactor productivity (STY) was maintained at a value of 200 g/l.h during the experiment and the reaction temperature was adjusted. The inlet pressure was 60 bar (absolute).

The initial reaction temperature needed to set the reactor productivity (STY) at a value of 200 g/l.h was 199° C. During the experiment the reaction temperature had to be gradually increased to maintain STY at 200 g/l.h. After 1,800 runhours, the experiment was stopped and the intrinsic activity of the catalyst was determined.

The intrinsic activity of the catalyst used in experiment 1 was 26% higher than the intrinsic activity of the catalyst used in comparative experiment 2. This shows that the method according to the invention results in improved catalyst stability compared to a process wherein less than 10 ppbv N-containing compound is present in the gaseous feed stream during start-up and the initial operation phase of the reactor.

That which is claimed is:

1. A method for start-up and operation of a Fischer-Tropsch reactor comprising the steps of:
   (a) providing a reactor with a fixed bed of reduced Fischer-Tropsch catalyst that comprises cobalt as catalytically active metal;
   (b) supplying a gaseous feed stream comprising carbon monoxide and hydrogen to the reactor, wherein the gaseous feed stream comprises a nitrogen-containing compound other than molecular nitrogen in an initial concentration, wherein the initial concentration in the range of from 10 to 350 ppbv based on the volume of the gaseous feed stream;

(c) converting carbon monoxide and hydrogen supplied with the gaseous feed stream to the reactor into hydrocarbons at a reaction temperature and at a set reactor productivity, whilst maintaining the initial concentration of the nitrogen-containing compound and maintaining the set reactor productivity during a first time period by adjusting the reaction temperature;

(d) decreasing the concentration of the nitrogen-containing compound to a second concentration in the range of from 0 to 20 ppbv, wherein the second concentration is at least 5 ppbv below the initial concentration, and maintaining the reactor productivity by adjusting the reaction temperature.

2. The method according to claim 1, wherein the catalyst is a fresh catalyst.

3. The method according to claim 1, wherein the nitrogen-containing compound is a compound selected from the group consisting of ammonia, HCN, NO, an amine and combinations or two or more thereof.

4. The method according to claim 3, wherein the nitrogen-containing compound is ammonia.

5. The method according to claim 1, wherein the initial concentration of the nitrogen-containing compound in the gaseous feed is in the range of from 20 to 150 ppbv.

6. The method according to claim 1, wherein the first time period is in the range of from 50 to 5,000 hours.

7. A method according claim 1, wherein the reactor is provided with a fixed bed of reduced catalyst in step (a) by reducing a fixed bed of catalyst precursor in the reactor.

8. The method according to claim 7, wherein the fixed bed of catalyst precursor is reduced by contacting the catalyst precursor with a hydrogen-containing gas comprising nitrogen or ammonia at a reduction temperature and pressure.

9. The method according to claim 8, wherein the hydrogen-containing gas comprises in the range of from 1 to 60 vol % nitrogen.

10. The method according to claim 8, wherein the hydrogen-containing gas comprises in the range of from 2 to 1000 ppmv ammonia.

11. The method according claim 1, wherein the catalyst does not comprise a noble metal.

12. The method according to claim 1, wherein the second concentration is at least 20 ppbv below the initial concentration.

13. The method according to claim 1, wherein the initial concentration of the nitrogen-containing compound in the gaseous feed is in the range of from 30 to 50 ppbv.

14. The method according claim 1, wherein the first time period is in the range of from 100 to 2,000 hours.

* * * * *